United States Patent Office 3,101,376
Patented Aug. 20, 1963

3,101,376
REACTIONS OF ORGANO BORANES
Stanley J. Brois, Westfield, and Alfred J. Rutkowski, Colonia, N.J., assignors to Esso Research and Engineering Company, a corporation of Delaware
No Drawing. Filed Apr. 30, 1962, Ser. No. 191,292
7 Claims. (Cl. 260—606.5)

This invention relates to the discovery of a novel displacement reaction involving organoboron compounds and saturated hydrocarbons. More particularly, this invention relates to the reaction of hydrocarbyl boron compounds with paraffins at elevated temperatures whereby a paraffin molecule displaces a hydrocarbyl radical, forming hydrogen and a new hydrocarbyl boron compound suitable for many uses. Still more particularly, this invention relates to a process for displacing an alkyl group in a trialkyl borane with the residue of a paraffin molecule to form an alkyl borane wherein the newly formed alkyl group corresponds in skeletal structure to the paraffinic molecule.

It has now been discovered that a hydrocarbyl boron compound may be reacted with a paraffin in a displacement type reaction whereby the paraffin molecule becomes the alkyl portion of the newly formed hydrocarbyl boron compound. Once having converted the paraffin to an alkyl group of a hydrocarbyl boron compound, it is then easily oxidized to the corresponding borate ester which will undergo simple hydrolysis or transesterification to liberate free alcohol. Alternatively, the newly formed hydrocarbyl boron compound may be dissociated to produce an olefin corresponding to the original paraffin reactant, or if desired additional paraffin may be reacted with the newly formed hydrocarbyl boron compound to repeat the original displacement reaction referred to. As an example of converting a paraffin to an alcohol, reference may be had to the following equations.

(I) 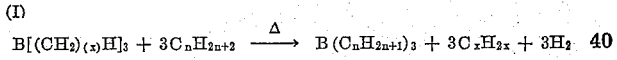
$$B[(CH_2)_{(x)}H]_3 + 3C_nH_{2n+2} \xrightarrow{\Delta} B(C_nH_{2n+1})_3 + 3C_xH_{2x} + 3H_2$$

(II) 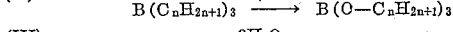
$$B(C_nH_{2n+1})_3 \xrightarrow{3/2\ O_2} B(O-C_nH_{2n+1})_3$$

(III) 
$$B(O-C_nH_{2n+1})_3 \xrightarrow{3H_2O} 3C_nH_{2n+1}OH + B(OH)_3$$

Equation I shows the reaction of a trialkylborane with an aliphatic paraffin to form a new trialkylborane compound wherein said latter alkyl groups correspond in carbon chain length and skeletal structure to the starting paraffin, and an olefin corresponding in carbon chain length to the alkyl group in the starting trialkylborane. This and other hydrocarbyl borane reactants employable are defined by the following formula:

$$B\begin{matrix}\diagup R \\ -R' \\ \diagdown R''\end{matrix}$$

wherein R represents a $C_1$–$C_{30}$ aliphatic alkyl group, straight chained or branched, and preferably a $C_6$ to $C_{24}$ alkyl group. As typical examples of the alkyl groups which R may represent are ethyl, n-hexyl, isooctyl, nonyl, dodecyl, hexadecyl, and homologues thereof. Alternatively, R may represent cycloalkyl groups having from 5 to 12 carbon atoms such as cyclohexyl, cycloheptyl, cyclooctyl, and cyclododecyl. In another embodiment R represents alkaryl and arylalkyl groups of from 7 to 18 carbon atoms. Examples of the latter hydrocarbyl radicals include benzyl, 2-phenylethyl, 4-phenylbutyl, 6-phenylhexyl, 8-phenyloctyl, 10-phenyldecyl and 12-phenyldodecyl.

R' and R'' will have the same definition as R and may be the same or dissimilar in any particular molecule, or they may represent hydrogen atoms. As examples of organoboron compounds wherein R, R', and R'' may be dissimilar organic radicals or hydrogen, there may be employed dibutylhexylborane, dioctyldecylborane, bis-tetradecyloctylborane, octyldecyldodecylborane, bis-tetradecylhexadecylborane, tetrabutyldiborane, tetrakis-dodecyldiborane, tetrakis-hexadecyldiborane, tris-octyldecyldiborane, bis-octyldiborane, bis-hexadecyldiborane, bis-cyclohexyldiborane, bis-(2-phenylethyl)diborane, tris-dodecyldiborane, tris-hexadecyldiborane, bis-dodecyloctyldiborane and the like.

The term "alkyl borane" is intended to include cyclic-organo boron compounds of the following structure

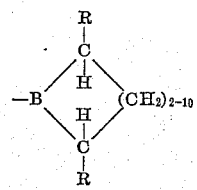

where R is an H or a lower alkyl. The remaining boron bond may be connected to an alkyl, aryl or the like group.

While Equation I above describes the overall reaction, it is to be understood that displacement usually occurs in a random manner to yield a variety of mixed alkyl borane products. Equation IV illustrates this point.

(IV)
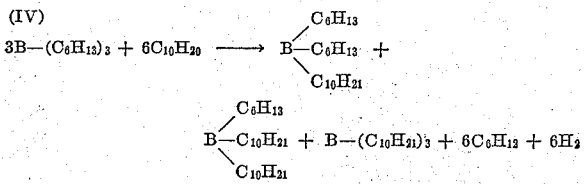

More complex mixtures of alkyl boranes are obtained when mixed paraffins and/or mixed alkyl boranes are employed as reactants. While the product obtained by this reaction in its crude form is of a mixed alkyl nature, distillation tends to rearrange the molecules in a more orderly form so that in the above case essentially all of the decyl radicals can be recovered in the form of tris-decyl borane.

As previously noted, the hydrocarbon reactant employable for the present reaction is preferably a paraffin having from 1 to 30 carbon atoms and more preferably from 6 to 24 carbon atoms. The paraffin may be cycloaliphatic; however, it is preferred to employ aliphatic paraffins in view of their lower cost. The paraffins may be either normal or branched, examples thereof being ethane, butane, isopentane, isooctane, n-nonane, dodecane, hexadecane, and the like. For some purposes, however, the cycloaliphatic compounds will be preferred. Examples of these compounds include cyclopentane, cyclohexane, cycloheptane, cyclooctane, cyclododecane, as well as the branched versions of these cycloaliphatic paraffins, such as methylcyclohexane, ethylcyclohexane, and ethylcycloheptane.

While paraffins have usually been considered to be inert with regard to trialkylboranes, it has been found that they can be made to undergo reaction with trialkylboranes at a temperature of 200° to 450° C.; although a temperature in the range of 250° to 350° C. is preferred. It is necessary to maintain the reaction temperature below the point where substantial degradation of the alkyl borane reactant and/or product occurs. At extremely high temperatures degradation of the paraffin especially in the presence of the organoborane may occur and such temperatures should be avoided. When employing high boiling organoboranes and paraffins, the reaction may be carried out under reflux and at essentially atmospheric pressures. If lower molecular weight boranes and/or paraffins are used, superatmospheric pressures at least sufficient to maintain the reactants in liquid phase may be employed. Thus pressures up to about 1500 p.s.i.g. are useful in this process. The displacing paraffinic hydrocarbon is preferably employed in large excess to drive the reaction in the desired direction. Also, hydrogen evolved during pyrolysis must be removed in order to prevent hydrogenolysis of the organoborane being formed. A palladium thimble would be suitable for this purpose. This process involves in equilibrium reaction and in the absence of insufficient paraffin, displacement will not occur to any appreciable extent. It is therefore preferred to employ at least 3 moles of paraffin per mole of trialkylborane reactant. These figures represent the stoichiometric quantities necessary for the complete displacement of the three alkyl groups with the paraffin residue. In more general terms, however, the quantities may vary between 1 to 50 moles and higher and preferably 5 to 20 moles of paraffin per mole of trialkylborane. Any unreacted paraffin may in a commercial process be recycled to the reaction. In a preferred embodiment, the molar ratio of paraffin to trialkylborane will be 10 to 1, although the specific ratio will be dependent on the particular reactor design selected.

If it is desired, however, to employ lower temperatures and smaller quantities of displacing hydrocarbon or to simply speed up the reaction a catalyst may be employed. In particular it has been found that certain catalysts can be used to substantially increase conversions and selectivities to the desired products.

Catalysts which will enhance the present displacement reaction fall into two general classes. There may be employed various metals supported or unsupported which are recognized by the art as being hydrogenation catalysts. These metals are generally found in group VIII of the periodic chart and of particular importance are nickel, iron, cobalt, platinum, palladium, rhodium, ruthenium, and the like. Supports such as $Al_2O_3$, charcoal, pumice and other conventional carriers may be employed. In addition, Lewis acids, a recognized class of compounds, are also useful. These include such compounds as aluminum chloride, aluminum fluoride, boron trifluoride, boron trifluoride etherate, stannic chloride, iron chloride, and elements such as iodine. The catalyst may be employed in an amount from 1 to 20 mole percent based on borane reactant, more preferably in an amount from 5 to 10 mole percent. The displacement reaction even with the catalyst is relatively slow, requiring a number of hours for any appreciable yield. Thus, it may be desirable to maintain the reactants under reaction conditions for periods up to 24 hours or greater.

Upon completion of the displacement reaction shown in Equations I and IV, the newly formed trialkylborane having alkyl groups corresponding in structure to the paraffin reactant, may then be oxidized, carbonated, aminated, halogenated, or the like in accordance with prior art procedures. To further illustrate the conversion of alkyl boranes to useful end products reference is now made to the following general description. Trialkylborane product from the reaction of a paraffin with a trialkyl borane may be oxidized at $-25°$ to $+50°$ C. with air or other molecular oxygen containing gas to obtain the corresponding borate ester

$B(OR)_3$

In some cases it may be desirable to stop the oxidation at some stage short of the borate ester as for example when the boronate ester $RB(OR)_2$ is obtained. Thus, trioctylborane, formed from octane and tributylborane for example, may be oxidized in the manner stated to obtain trioctyl borate. This and other borate esters are useful as such or may be converted by simple hydrolysis or transesterification to the free alcohol, i.e. octanol. Water, aqueous acid or alkaline solutions, e.g. 5 wt. percent caustic soda, may be used to hydrolyze the borate or boronate esters. Alcohol product is recovered by phase separation and distillation in accordance with standard laboratory procedures. In lieu of air or molecular oxygen oxidation other oxidizing agents such as hydrogen peroxide in aqueous alkaline solution, potassium permanganate, nitric acid, or the like may be employed.

Thus, there is provided an integrated process for the conversion of a paraffin to a primary alcohol, aldehyde, acid, or the like. The conversion of trialklborane to its ester or the like derivative and the further conversion of the ester to the alcohol is well known in the art but, nevertheless, forms a part of this invention in that it relates to the integrated commercially attractive process described and claimed herein.

A better understanding of the invention may be had by resort to the following examples:

*Example 1*

To 0.5 mole (113.2 grams) of refluxing cetane (boiling point 287.5° C.) there was added dropwise 35 grams (0.1 mole) of trioctylborane. An evolution of hydrogen was noted and after a maximum of 4.5 liters of gas (hydrogen) were evolved which took approximately 12 hours, there were recovered 21 grams of low boiling material, B.P. 122–124° C., which was distilled from the reaction mixture. This fraction was analyzed and found to contain octane, 1-octene, trans-2-octene and cis-2-octene. The material boiling above 124° C. which contained 5 mole percent cetylborane was oxidized with an alkaline solution of 30 wt. percent aqueous $H_2O_2$ and simultaneously hydrolyzed. The oxidized portion boiling between 140–175° C. at 1 mm. Hg pressure was collected. Analysis of this fraction showed the production of 15 mole percent n-hexadecyl alcohol based on trioctylborane reactant. The cetylborane product as formed is a mixture of hydrocarbyl boranes having from 1 to 3 cetyl groups per boron atom. Upon distillation of this product rearrangement to the tricetylborane occurs.

*Example 2*

A one liter, 4-necked flask, equipped with a condenser, thermowell, dropping funnel, and stirrer was charged with 600 mmoles (119 gms., 155 cc.) of freshly distilled tetradecane and 2 cc. (9.5 mmoles) of boron trifluoride etherate. The mixture was heated to reflux and 100 mmoles (35.0 gms.) of tri-n-octylborane were added. After the gas and olefin (octene) had been distilled off, the residue was oxidized with alkaline hydrogen peroxide and set for V.P.C. analysis. This analysis showed a 25 mole percent yield of n-tetradecanol based on alkyl borane.

*Example 3*

The procedure of Example 2 was followed except that 10 mmoles of 20 mesh nickel were used instead of boron trifluoride etherate. V.P.C. analysis indicated appreciable yield of n-tetradecanol.

*Example 4*

Into a stainless steel autoclave capable of withstanding high pressure is placed 0.1 mole of trioctylborane and 1.0 mole of cyclohexane. The autoclave is equipped with a palladium containing tube which permits only hydrogen to be removed from the autoclave. The autoclave is heated to 285° C. and is maintained at this temperature until the hydrogen evolution ceases. The contents of the autoclave are removed and the volatile materials boiling below 150° C. are separated. The higher boiling material is diluted with 200 ml. of absolute ethanol and 30% hydrogen peroxide is added in sufficient amount to oxidize all carbon-boron bonds. Hydrolysis of the oxidized product yields cyclohexanol.

*Example 5*

Butylbenzene and tributylborane in a molar ratio of 5/1 are preheated to 200° C. and are passed over a fixed bed of palladium on charcoal (10 wt. percent) heated to 450° C. The volatile material consisting of hydrogen, butene and unreacted butylbenzene are separated from the high boiling material by distillation. This high boiling residue from the distillation is oxidized with alkaline 30% hydrogen peroxide and butanol and 4-phenyl-1-butanol are recovered.

*Example 6*

To 0.5 mole of refluxing cetane (boiling point 287.5° C.) is added slowly 0.1 mole of tetrabutyldiborane. Hydrogen is continuously evolved during the addition. The low boiling hydrocarbons are continuously removed from the reaction zone and analyzed for butane and butene. After cooling, the residue is oxidized and n-hexadecyl alcohol is recovered by distillation.

*Example 7*

Butane and tri-dodecylborane in a molar ratio of 15/1 are placed into a pressure autoclave which is then heated to 200° C. Hydrogen is continuously removed as in Example 4. When the hydrogen evolution ceases the autoclave is cooled down to room temperature and emptied. The unreacted butane is removed and the residue is oxidized with alkaline 30% hydrogen peroxide and n-butanol is recovered by distillation.

*Example 8*

The procedure of Example 4 is followed except that 2-methylpentane is reacted with trioctylborane at 300° C. Analysis of the oxidized product shows that 4-methyl-1-pentanol is the major component of the $C_6$ alcohol material with smaller amounts of other isomeric methyl pentanols also formed.

What is claimed is:
1. A process which comprises reacting an organo boron compound having the following formula

wherein each R represents a hydrocarbyl radical selected from the group consisting of alkyl, cycloalkyl, alkaryl and arylalkyl radicals, with a paraffin having from 1 to 30 carbon atoms at a temperature between 200 to 450° C. and for a time sufficient to displace at least one of said hydrocarbyl radicals with a hydrocarbyl radical having the same carbon skeletal structure as said paraffin.

2. A process in accordance with claim 1 wherein said organo boron compound is an alkyl borane.

3. A process in accordance with claim 1 wherein said paraffin is an aliphatic compound.

4. A process in accordance with claim 1 wherein said paraffin is a cycloaliphatic compound.

5. A process for preparing trialkylborane which comprises reacting a trialkylborane reactant wherein each alkyl group contains from 1 to 30 carbon atoms with an excess of a paraffin containing from 1 to 30 carbon atoms, at a temperature of 200 to 450° C. for a time sufficient to displace at least one of the alkyl radicals in said trialkylborane reactant and to form a trialkylborane product wherein at least one of the alkyl groups in said trialkylborane product corresponds in carbon skeletal structure to that of the paraffin reactant.

6. A process in accordance with claim 5 wherein hydrogen is removed during the reaction.

7. A process for preparing an organo borane which comprises reacting a trialkylborane reactant with a paraffin at elevated temperatures in the presence of a catalyst selected from the group consisting of Lewis acids and metals of group VIII of the periodic chart, for a time sufficient to form trialkylborane product wherein at least one of the alkyl groups in said product corresponds in carbon skeletal structure to the paraffin reactant.

No references cited.